United States Patent
Liu et al.

(10) Patent No.: US 12,275,088 B2
(45) Date of Patent: Apr. 15, 2025

(54) COAXIAL LASER HOTWIRE HEAD

(71) Applicant: Illinois Tool Works Inc., Glenview, IL (US)

(72) Inventors: Shuang Liu, Appleton, WI (US); Erik Miller, Verona, WI (US)

(73) Assignee: Illinois Tool Works Inc.

( * ) Notice: Subject to any disclaimer, the term of this patent is extended or adjusted under 35 U.S.C. 154(b) by 0 days.

(21) Appl. No.: 16/003,263

(22) Filed: Jun. 8, 2018

(65) Prior Publication Data

US 2018/0354075 A1    Dec. 13, 2018

Related U.S. Application Data

(60) Provisional application No. 62/517,781, filed on Jun. 9, 2017.

(51) Int. Cl.
    *B23K 26/342*      (2014.01)
    *B23K 9/10*      (2006.01)
    (Continued)

(52) U.S. Cl.
CPC .......... *B23K 26/342* (2015.10); *B23K 9/1093* (2013.01); *B23K 26/0608* (2013.01); *B23K 26/0617* (2013.01); *B23K 26/0622* (2015.10); *B23K 26/064* (2015.10); *B23K 26/0673* (2013.01); *B23K 26/0676* (2013.01); *B23K 26/073* (2013.01); *B23K 26/0736* (2013.01); *B23K 26/082* (2015.10); *B23K 26/14* (2013.01);

(Continued)

(58) Field of Classification Search
CPC ............ B23K 26/0608; B23K 26/0617; B23K 26/0622; B23K 26/342; B23K 26/064; B23K 26/082; B23K 26/704; B23K 26/06
See application file for complete search history.

(56) References Cited

U.S. PATENT DOCUMENTS

| | | | |
|---|---|---|---|
| 4,580,026 A * | 4/1986 | Stol .................. | B23K 9/1093 219/136 |
| 7,259,353 B2 | 8/2007 | Guo | |

(Continued)

FOREIGN PATENT DOCUMENTS

| | | |
|---|---|---|
| CN | 1191790 | 9/1998 |
| CN | 101386111 | 3/2009 |

(Continued)

OTHER PUBLICATIONS

Canadian Office Communication Appln No. 3,066,650 dated Feb. 23, 2021.
European Office Communication AppIn No. 18735097.0 dated Feb. 6, 2023.

*Primary Examiner* — Phuong T Nguyen
*Assistant Examiner* — Dilnessa B Belay
(74) *Attorney, Agent, or Firm* — MCANDREWS HELD & MALLOY LTD.

(57) ABSTRACT

A laser processing head includes first and second contact points connected to a power source. The power source generates a current to flow through an electrode wire between the first and second contact points to heat the electrode wire. A laser source generates one or more laser beams having lasing power sufficient to at least partially melt the electrode wire. A coaxial laser head focuses the one or more laser beams at one or more focal points on a workpiece to at least partially melt the electrode wire.

20 Claims, 5 Drawing Sheets

(51) Int. Cl.

| | |
|---|---|
| *B23K 26/06* | (2014.01) |
| *B23K 26/0622* | (2014.01) |
| *B23K 26/064* | (2014.01) |
| *B23K 26/067* | (2006.01) |
| *B23K 26/073* | (2006.01) |
| *B23K 26/082* | (2014.01) |
| *B23K 26/14* | (2014.01) |
| *B23K 26/21* | (2014.01) |
| *B23K 26/34* | (2014.01) |
| *B23K 26/348* | (2014.01) |
| *B23K 26/60* | (2014.01) |
| *B23K 26/70* | (2014.01) |
| *B33Y 10/00* | (2015.01) |
| *B33Y 30/00* | (2015.01) |
| *B33Y 40/10* | (2020.01) |

(52) U.S. Cl.
CPC ...... *B23K 26/1464* (2013.01); *B23K 26/1476* (2013.01); *B23K 26/21* (2015.10); *B23K 26/34* (2013.01); *B23K 26/348* (2015.10); *B23K 26/60* (2015.10); *B23K 26/704* (2015.10); *B33Y 40/10* (2020.01); *B33Y 10/00* (2014.12); *B33Y 30/00* (2014.12)

(56) References Cited

U.S. PATENT DOCUMENTS

| | | | |
|---|---|---|---|
| 9,597,749 B2 * | 3/2017 | Bruck | B23K 26/21 |
| 2002/0017513 A1 * | 2/2002 | Nagura | B23K 26/1438 |
| | | | 219/121.84 |
| 2007/0051714 A1 * | 3/2007 | Ou | B23K 9/1043 |
| | | | 219/130.21 |
| 2012/0285932 A1 * | 11/2012 | Yuan | B23K 9/173 |
| | | | 219/74 |
| 2016/0346875 A1 * | 12/2016 | Bruck | B23K 26/34 |
| 2018/0050421 A1 * | 2/2018 | Marchione | B23K 26/34 |
| 2018/0221989 A1 * | 8/2018 | Matsuoka | B23K 26/02 |
| 2019/0111517 A1 * | 4/2019 | Muratani | B23K 26/064 |
| 2022/0072657 A1 * | 3/2022 | Matsuo | B23K 37/0241 |

FOREIGN PATENT DOCUMENTS

| | | | |
|---|---|---|---|
| CN | 101530945 | | 9/2009 |
| CN | 101770076 B | * | 2/2012 |
| CN | 104640664 | | 5/2015 |
| CN | 105499791 | | 4/2016 |
| EP | 0177340 | | 4/1986 |
| EP | 3597354 | | 1/2020 |
| WO | 2007057502 | | 5/2007 |
| WO | 2014009800 | | 1/2014 |
| WO | 2014013322 | | 1/2014 |

\* cited by examiner

COAXIAL LASER HOTWIRE HEAD

CROSS-REFERENCE TO RELATED APPLICATIONS

This patent application claims priority to and the benefit of U.S. Provisional Patent Application Ser. No. 62/517,781, filed on Jun. 9, 2017, which is incorporated herein by reference in its entirety.

BACKGROUND

Welding is a process that has historically been a cost effective joining method. Welding is, at its core, simply a way of bonding two pieces of parent material. Laser welding is a welding technique used to join multiple pieces of metal through the use of a laser. The beam provides a concentrated heat source, enabling a precise control of the heat input and high welding speed, creating a weld with low heat input, and a small heat affected zone. In various applications, filler metal may be needed for different purposes such as filling up the gap, reinforcing the joint, overlaying the substrate surface, building up an object, or acting as a buffering medium. The filler material can be brought into the molten pool, either by pre-deposited layer, or by feeding powder or wire. Pre-deposited layering is not preferred in all applications, due to time demands and the difficulty in forming complex shaped objects. Powder injection methods are in wide use due to the flexibility and accuracy the method provides.

Wire feeding is a less common but promising technique, for example in the deposition of large structures. In comparison to additive manufacturing using powder, wire feeding offers several advantages, including near total material utilization, good out-of-position tolerance, high deposition rate, cleaner work environment, safer operations, and low material costs. In some examples, the wire is provided by the welding tool and melted by power provided at the workpiece, in other words, a cold wire. In other examples, the wire is preheated to increase the temperature of the wire before application to the workpiece.

In some examples, power from a laser beam(s) is used to melt the wire during a welding operation, which may offer expanded opportunities for laser applications. However, the wire is typically fed laterally into the molten pool, which makes the process direction dependent, requiring strict alignment of the wire and the laser beam. Thus, a system that overcomes the challenges, yet incorporates the benefits, of both preheating and laser technology is desirable.

BRIEF SUMMARY

This disclosure relates generally to wire preheating systems, methods, and apparatuses for use with a welding processing head. More particularly, this disclosure relates to a laser welding processing head that enables continuously fed electrode wire to be preheated for use in laser welding systems employing a coaxial laser head. As described herein, a coaxial laser head is defined as a laser head used in welding with a centric wire feeding system.

In disclosed examples, a laser processing head is provided that includes a first contact point connected to a power source and a second contact point connected to the power source, the power source configured to generate a current to flow through an electrode wire between the first contact point and the second contact point to heat the electrode wire. A laser source is configured to generate one or more laser beams having lasing power sufficient to at least partially melt the electrode wire. And a coaxial laser head is configured to focus the one or more laser beams at one or more focal points on a workpiece to at least partially melt the electrode wire.

In some examples, the electrode wire is in electrical contact with both the first contact point and the second contact point.

In examples, the focal point corresponds to a location at which the electrode wire makes contact with the workpiece.

In some examples, the power source includes a controller configured to control a level of current flowing through the electrode wire between the first and second contact points to adjust a level of heating in the electrode wire. In examples, the controller is further configured to receive a current measurement from a sensor in a current feedback loop and to control the level of current based on the current feedback loop. In some examples, the power source includes a controller configured to receive a voltage measurement between the first and second contact points from a sensor in a voltage feedback loop; and to control the level of voltage based on the voltage feedback loop.

In examples, the coaxial laser head is configured to scan the one or more laser beams about the one or more focal points as a hollow coned-shaped beam. In some examples, the coaxial laser head is configured to scan the one or more laser beams in a continuous pattern. In examples, the coaxial laser head is configured to split a lasing beam of the one or more lasing beams into two or more beams; and to focus the two or more beams toward the focal point. In some examples, the coaxial laser head is configured to create one of a plurality of heating profiles at the focal point by moving the laser power about the focal point in one or more of a plurality of patterns. In examples, the plurality of patterns include a circle, an ellipse, a zigzag, a figure-8, a crescent, a triangle, a square, a rectangle, a non-linear pattern, an asymmetrical pattern, a pause, or any combination thereof.

In some examples, the processing head is configured to perform an additive manufacturing operation using the electrode wire.

In another disclosed example, a method to perform an additive manufacturing, welding or cladding process, is provided. The method includes generating, at a power source, a current to flow through an electrode wire between a first contact point and a second contact point to heat the electrode wire; generating, at a laser source, one or more laser beams, the one or more laser beams collectively having lasing power sufficient to at least partially melt the electrode wire; and focusing, by the laser source, the one or more laser beams at one or more focal points on a workpiece at which the electrode wire makes contact with the workpiece to at least partially melt the electrode wire.

In some examples, the method further includes controlling, by a controller, a level of current flowing through the electrode wire to adjust a level of heating in the electrode wire in response to a voltage feedback signal.

In examples, the method further includes adjusting, by the power source, a heat value of the electrode wire based on a deposition rate of the electrode wire.

In some examples, the method further includes adjusting at least one of a lasing power level, a spot size of the lasing power, or a shape of the one or more laser beams to adjust a power profile of the laser power at the focal point.

In yet another disclosed example, a laser welding system includes a wire feeder to drive an electrode wire to a processing head, the processing head includes a first contact point and a second contact point. One or more power sources are connected to both of the first and second contact points, the one or more power sources being configured to generate a current to flow through the electrode wire between the first contact point and the second contact point to heat the electrode wire; and provide power to the electrode wire to create an arc between the electrode wire and the workpiece via the first contact point or the second contact point. A laser source configured to generate one or more laser beams having lasing power sufficient to at least partially melt the electrode wire. And a coaxial laser head configured to focus the one or more laser beams at one or more focal points on the workpiece to at least partially melt the electrode wire.

In some examples, a wire heater configured to heat the electrode wire at a location before or after the first and second contact points along a wire feed path of the electrode wire.

In examples, a controller configured to selectively heat the electrode wire at a location before or after the first and second contact points along a wire feed path of the filler wire.

In some examples, the laser source is configured to select a shape of the spot of lasing power or distribution of lasing power at the workpiece to correspond to one of a plurality of heat profiles.

In examples, the laser source includes an optical device configured to focus the lasing power including one of a beam splitter, a mirror, an optical fiber, a lens, and a diffraction grating.

In some examples, an arc clamp module is coupled to the first contact point and the second contact point, the arc clamp module being configured to provide a feedback signal to the controller associated with a voltage or a current at the first contact point and the second contact point; and redirect at least a part of the current to flow through the arc clamp module in response to a control signal from the controller based on the feedback signal.

BRIEF DESCRIPTION OF THE DRAWINGS

The figures are not to scale. Where appropriate, the same or similar reference numerals are used in the figures to refer to similar or identical elements.

DETAILED DESCRIPTION

Figure 1:
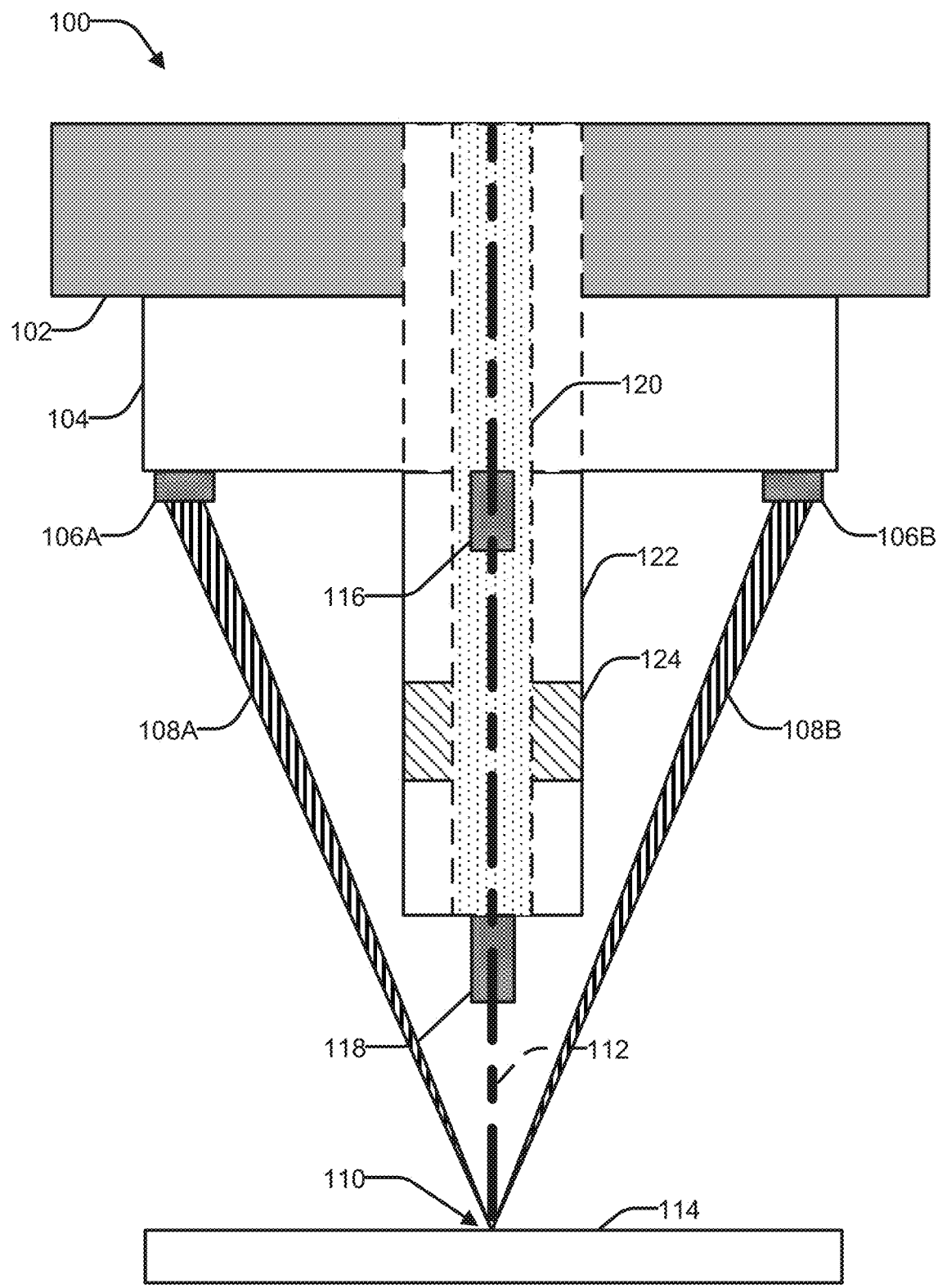
FIG. 1 illustrates an example laser processing head for a welding system, in accordance with aspects of this disclosure.

The present disclosure relates to a laser welding processing head that enables continuously fed electrode wire to be preheated for use in laser welding systems employing a coaxial laser head. Example systems and methods disclosed herein employ the coaxial laser head to generate and focus a number of laser beams (i.e. one or more) onto one or more focal point locations on a workpiece. The focal point(s) correspond to a contact point of the electrode wire where a weld puddle is being formed. For example, power from the laser beam(s), along with the preheat energy in the case of hot wire feed, is used to melt the electrode wire during a welding operation. The power required from the laser beam to melt the electrode is determined at least in part by the level of preheating of the electrode wire. For instance, the electrode wire is preheated to a level below the melting temperature of the electrode wire. The lasing power applied to the preheated wire would thus be reduced in comparison to the power needed to melt a cold wire, for example.

In some conventional applications, the wire is fed laterally to the molten pool, which makes the process direction dependent, with strict alignment of the wire and the laser beam. In this disclosure, a coaxial laser head with centric wire feeding system is provided. The coaxial laser head enables the laser processing of complex shaped objects by different applications, simplifies the two working axes to one axis, and reduces the number of controlling parameters, such as wire placement position and angle relative to laser beam. Further, the preheating method on the wire is independent of the substrate or molten pool conditions, delivering a very stable process.

In some examples, the coaxial laser head can generate lasing power as a constant, continuous laser beam, wherein some examples lasing power is generated as a pulsed laser. The laser beam can be split, such that two or more laser beams can be focused at one or more focal points associated with the weld puddle. In examples, the coaxial laser head can rotate about an axis that is collinear with the electrode wire as the electrode wire moves through the laser processing head to the workpiece.

The alignment of the laser generators and the electrode wire provides advantages over non-aligned systems, such as laser welding systems that employ lasers that are located remotely from the electrode wire and/or offset from a central axis. The relative positioning of the laser generators in the coaxial laser head and the electrode wire provide a compact device that maintains a simple and predictable axis for deposition of the electrode wire to a weld joint. Thus, the direction and angle of the disclosed laser processing head allows for access to challenging welds (e.g., for welds in tight corners, small spaces, or obscured by other parts of the workpiece, etc.) that would have been difficult or impossible for a conventional, non-aligned welding systems.

Furthermore, non-aligned systems require complex modeling to ensure the laser power and the electrode wire make contact with the workpiece at the same focal point. For example, wire placement, application angle, direction of travel, as well as the physical positioning of mechanical arms in a non-aligned system would increase the number of variables and processing power needed to provide a consistent weld quality.

Additionally, preheating the electrode wire enables the system to increase the deposition rate during a welding process in comparison to a cold wire system, as well as reducing the required lasing power to form a weld. For example, common issues for cold wire processes include sensitivity to experimental conditions and strict tolerance of processing parameters. Hot wire offers an alternative to cold wire, which can enhance the stability and productivity of the deposition process. Laser energy can be used to melt a substrate surface to form a metallurgical bond. Preheating the wire can additionally release casting force on the wire, which softens the wire to reduce the recoiling force against the wire and the welding torch. Laser hot-wire technique results in the overall more efficient use of energy and it increases the deposition rate, which can be as much as three times higher than with cold wire or powder.

For the purpose of promoting an understanding of the principles of the claimed technology and presenting its currently understood best mode of operation, reference will be now made to the examples illustrated in the drawings, and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art, to which the claimed technology relates.

As used herein, the word "exemplary" means serving as an example, instance, or illustration. The examples described herein are not limiting, but rather are exemplary only. It should be understood that the described examples are not necessarily to be construed as preferred or advantageous over other examples. Moreover, the term "examples" does not require that all examples of the disclosure include the discussed feature, advantage, or mode of operation.

As used herein, a wire-fed welding-type system refers to a system capable of performing welding (e.g., gas metal arc welding (GMAW), gas tungsten arc welding (GTAW), etc.), brazing, cladding, hardfacing, and/or other processes, in which a filler metal is provided by a wire that is fed to a work location, such as an arc or weld puddle.

As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, preheating refers to heating the electrode wire prior to a welding arc and/or deposition in the travel path of the electrode wire.

Some disclosed examples describe electric currents being conducted "from" and/or "to" locations in circuits and/or power supplies. Similarly, some disclosed examples describe "providing" electric current via one or more paths, which may include one or more conductive or partially conductive elements. The terms "from," "to," and "providing," as used to describe conduction of electric current, do not necessitate the direction or polarity of the current. Instead, these electric currents may be conducted in either direction or have either polarity for a given circuit, even if an example current polarity or direction is provided or illustrated.

FIG. 1 illustrates a functional diagram of an example laser processing head 100, which can be integrated with a welding torch. The processing head 100 is connected to one or more power supplies to provide preheating power and/or lasing power for a continuously fed electrode wire 112. The electrode wire 112 can be a "cold" wire or a "hot" wire (e.g., preheated), to be used in additive manufacturing, welding and/or brazing operations.

The processing head 100 includes a base 102 to support a coaxial laser head 104. The coaxial laser head 104 is configured about an axis that is collinear with the electrode wire 112. The electrode wire 112 is directed to the workpiece 114 via a wire guide 120 within the torch. In the example of FIG. 1, the electrode wire 112 is driven through the processing head 100 via a wire guide 120 toward a workpiece 114. The coaxial laser head 104 can include a laser source (e.g., the laser source 170 of FIG. 3) as well as one or more lenses 106A, 106B or other optical devices to direct one or more laser beams 108A, 108B from the coaxial laser head 104 to focus on one or more focal point locations 110 on the workpiece 114. For example, the focal point locations 110 may correspond to the contact point of the electrode wire 112. Thus, power from the laser beams 108A, 108B can be used to melt the electrode wire 112 during a welding operation. The laser beams 108A, 108B may be focused on the workpiece 114 to create a pool of molten material. Contact with the molten pool (e.g., puddle) by the electrode wire 112 causes the electrode wire 112 to melt into the puddle.

In some examples, the coaxial laser head 104 can provide lasing power as a constant, continuous laser beam. Additionally or alternatively, coaxial laser head 104 provides a pulsed laser beam and/or any other desired lasing profile. The particular amount of lasing power, frequency of a pulsed beam, and/or other control parameters associated with the application of lasing power may be controlled from a coordinated controller and/or the laser source.

Although FIG. 1 illustrates two lenses 106A, 106B, the coaxial laser head 104 can be configured with a single lens or two or more lenses. In some examples, a lens of the coaxial laser head 104 is configured to rotate about the axis, such as by rotation of the coaxial laser head 104. In some examples, the laser beam directed by the lens(es) can be generated continuously, providing a generally cone-shaped laser profile that defines a "hollow" interior that results in the focus of the lasing power at the focal point location 110. In other examples, the laser beam can be generated in a series of regularly or irregularly timed pulses. In some examples, a single laser beam can be split by one or more optical elements, such as a mirror, a beam splitter, a grating, or other suitable device. The coaxial laser head 104 can be configured to focus each beam of the split laser beam at the focal point 110, for instance.

In disclosed examples, the laser source(s) are powered by one or more power converters to melt the wire 114. In some examples, an arc welding operation is employed independently of or in concert with the laser source(s) to melt the wire 114. The arc welding power can be provided separately from the power converter powering the laser source(s), or from another power converter.

In examples, the processing head 100 can include one or more preheating devices. In the example of FIG. 1, a first contact point 116 and a second contact point 118 can be connected to one or more power converters (see, e.g., FIG. 2B) to pass a current through a portion of the wire 112 between the first and second contact points 116, 118. The current resistively heats the wire 112, raising a heat value (e.g., enthalpy, temperature, etc.) of the wire 112. In this manner, the wire 112 is preheated before making contact with the workpiece 114. The amount of lasing power required to melt the preheated wire 114 (e.g., via the puddle) is therefore reduced. A contact point can include any variety of materials and/or devices suitable for conducting electrical signals (e.g., metallic contact, welding contact tips, brushes, etc.).

In some examples, additional and/or alternative preheating devices can be employed. In some examples the preheating device can be located along a wire feed path to the processing head (e.g., near a wire feeder). In other examples, the preheating device can be integrated with the processing head 100. For example, a third and/or fourth contact point(s) can be included within the processing head 100 or at another location along a wire feed path to resistively heat the wire 112. Additionally or alternatively, a resistive heating coil 124 can be included, configured to radiate heat sufficient to raise a heat value associated with the wire 112 via the wire guide 120. An example includes constructing the resistive heating coil 124 using a nichrome alloy, platinum, and/or another suitable material, to simultaneously physically support and/or guide the electrode wire 112 from the wire supply to the welding gun and to heat the electrode wire 112 at the same time. The heating coil 124 can be heated by one or more of the power converters (e.g., power converters 140-144 of example power supply 132 of FIG. 2B). The electrode wire 112 is heated by the heating coil 124 so that the electrode wire 112 has an elevated temperature (increased enthalpy value) by the time the electrode wire 112 reaches the workpiece 114.

In some examples, a resistive heating system (e.g., using first and second contact points 116, 118) and a radiated heating coil 124 can be integrated into one processing head 100, such that a heating profile of the wire 112 can be dynamically adjusted by one or more of the heating modes in response to one or more inputs (e.g., deposition rate, wire type, temperature, welding-type operation, etc.). The heating modes can be controlled by a controller (e.g., controller 152 of FIG. 2B), such that both are powered by a single power conversion circuit (e.g., second power converter 142 of FIG. 2B alternatively powering each heating mode). Additionally or alternatively, each heating mode can be powered by respective power conversion circuits (e.g., the second power converter 142 powers the resistive heater, whereas a third power converter 144 powers the radiated heating coil 124).

Figure 2A:
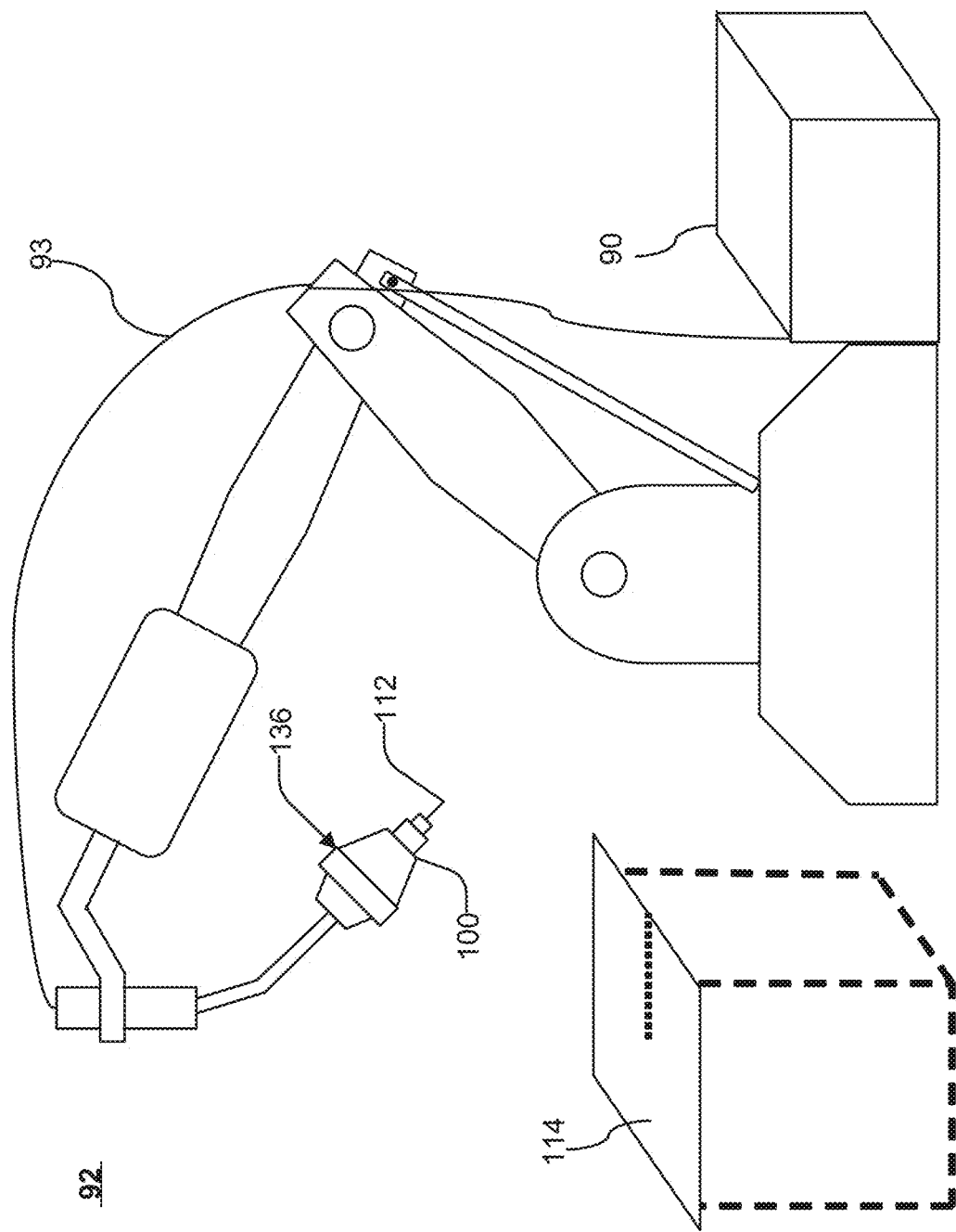
FIGS. 2A and 2B illustrate a functional diagram of an exemplary laser welding system, in accordance with aspects of this disclosure.

Referring to FIG. 2A, an example welding-type system is shown in which a robot 92 is used to weld a workpiece 114 using a welding tool 136, such as the illustrated bent-neck (i.e., gooseneck design) welding torch (or, when under manual control, a handheld torch), to which power is delivered by welding equipment 90 via conduit 93.

Figure 2B:
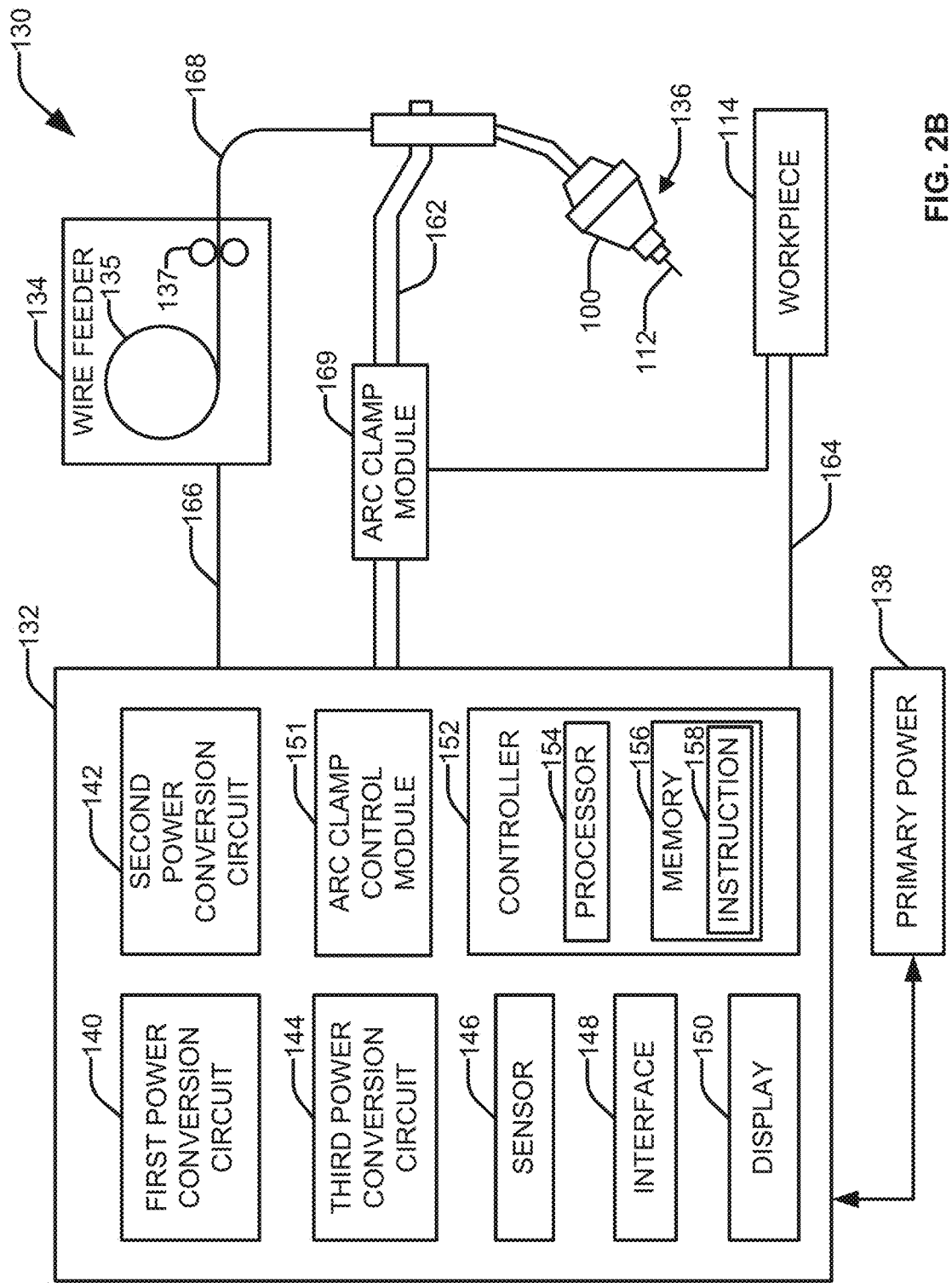

FIG. 2B is a block diagram of an example implementation of a welding-type system 130 that includes a power supply 132. In some examples, the welding-type system 130 is configured to perform additive manufacturing, welding and/or brazing operations. The example power supply 132 powers and controls a welding application. In some examples, the power supply 132 directly supplies input power to a welding torch 136. In some examples, the welding torch 136 includes a processing head 100 with a laser coaxial head 104, as shown in FIG. 1. In the illustrated example, the welding supply 132 is configured to supply power to welding operations and/or preheating operations. The example welding power supply 132 is also configured to provide power to one or more welding accessories, such as a wire feeder 134 to supply the electrode wire 112 to the welding torch 136 for various welding applications (e.g., GMAW welding, flux core arc welding (FCAW)), an induction heater, etc. As shown, wire feeder 134 includes a reel 135 to hold a roll of electrode wire 112. Rollers 135 drive the wire 112 from the reel 135 to the welding torch 136 via wire path 168.

The power supply 132 receives primary power 138 (e.g., from the AC or DC power grid, an engine/generator set, a battery, or other energy generating or storage devices, or a combination thereof), conditions the primary power, and provides an output power to one or more welding devices and/or preheating devices in accordance with demands of the system. The primary power 138 may be supplied from an offsite location (e.g., the primary power may originate from the power grid). In the example of FIG. 1, the welding power supply 132 includes power converters 140, 142 and 144, each of which ay include transformers rectifiers, switches, and so forth, capable of converting the primary power to AC and/or DC output power as dictated by the demands of the system particular welding processes and regimes). The power converters 140-144 convert input power (e.g., the primary power 138) to welding-type laser power and/or low voltage power for preheating an electrode wire.

In some examples, the power converters 140-144 are configured to convert the primary power 138 to both welding-type laser power and preheating power outputs. However, in other examples, each of the power converters 140-144 is adapted to convert primary power to one of a weld laser power output and a preheating power. Any suitable power conversion system or mechanism may be employed by the power supply 132 to generate and supply both welding and preheating power. Although illustrated as a single power supply 132, in some examples multiple power supplies are provided, such as to provide power to one or more of the conversion circuits 140-144 and/or one or more of the wire feeder 134, welding tool 136, a preheating device, etc.

The power supply 132 is configured to connect to a welding-type tool, such as welding torch 136, via a cable and/or control arm 162 to transmit power, send and/or receive information, and/or control movement of the torch. The electrode wire 112 can be used to perform a weld on a workpiece 114. In some welding environments, the workpiece 114 is configured to connect with the power supply 132 via a cable 164. A wire feeder 134 provides the electrode wire 112 via a e feed path 168, the wire feeder 134 configured to send and/or receive information to and/or from the power supply 132 via a cable 166.

In some examples, the power converters 140-144 are located in the power supply 132. In an example, the first power converter 140 is configured to output welding-type laser power for laser and/or arc welding operations. The second power converter 142 can be configured to output a power to a preheating system (see, e.g., FIG. 1). In some examples, the first power converter 140 and the second power converter 142 are configured to receive commands and/or information from a controller 152, for example, in accordance with an identified welding operation. For example, the second power converter 142 can provide power to a preheating device along the wire path, such as within the processing head 100. Preheating the wire 112 requires less lasing power in order to melt the wire 112 to form a weld.

In other examples, the system 130 is configured to heat the wire 112 at a location along the wire path, such as between the wire feeder 134 and the processing head 100. In addition to the contact points located within be torch 13, two or more contact points and/or a heating coil can be located before the processing head 100, such as on or near wire feeder 134. The additional or alternative contact points and/or heating coil can be controlled by the controller 152 to operate in conjunction with the wire feeder 134, a welding torch 136, and the processing head 100. For example, the controller 152 can receive information (e.g., feedback) regarding an output or other characteristic of the system. In response, the controller 152 can adjust a parameter of the system, such as laser power, preheating power, wire feed speed, etc.

Figure 3:
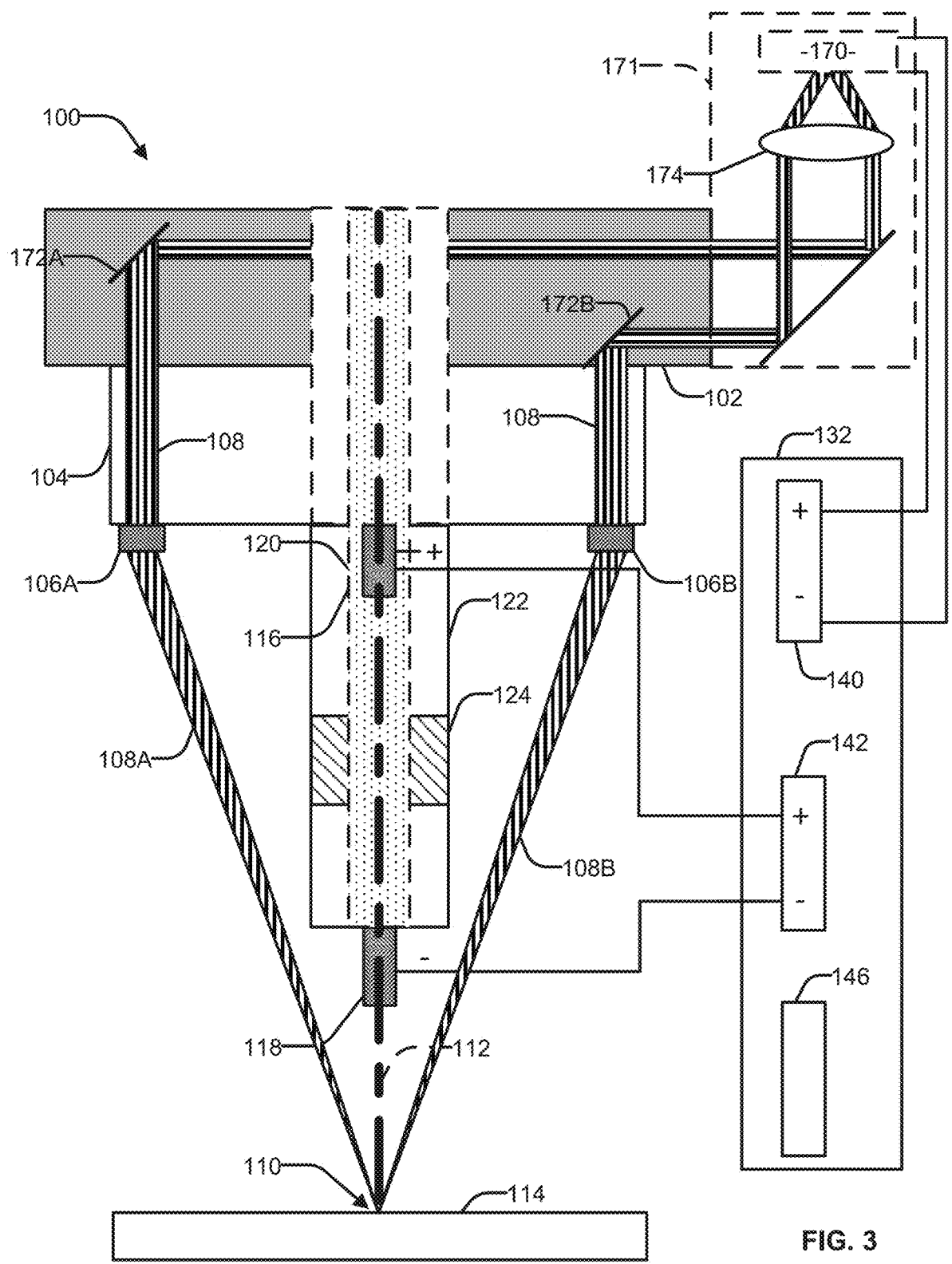
FIG. 3 illustrates an example laser processing head control for a welding system, in accordance with aspects of this disclosure.

In an example implementation of the system illustrated in FIG. 2B, the first power converter 140 is configured to provide welding laser power, such as to generate lasing power at a laser source (see, e.g., FIG. 3). In an example, the second power converter 142 is configured to connect to the first contact point 116 and the second contact point 118. The second power converter 142 can be configured to provide a signal (e.g., between 0-14 volts) to resistively heat the electrode wire 112 between the first contact point 116 and the second contact point 118. In disclosed examples, the first power converter 140 and the second power converter 142 are configured to cooperate, providing both resistive heating as well as a lasing power.

In some examples, the third power converter 144 to provides additional and/or alternative preheating for the electrode wire 112. For example, the third power converter 144 can provide additional preheating power in the processing head 100 (e.g., to the heating coil 124) or at a different location along the wire path (e.g., at or near the tip of the wire 112).

The welding power supply 132 also includes a user interface 148. The controller 152 receives input from the user interface 148, through which a user may choose a process and/or input desired parameters (e.g., voltages, currents, particular pulsed or non-pulsed welding regimes, preheat energy or power, and so forth). The user interface 148 may receive inputs using any input device, such as via a keypad, keyboard, buttons, knobs, touch screen, voice activation system, wireless device, a remote processor, etc. Furthermore, the controller 152 controls operating parameters based on input by the user as well as based on other current operating parameters. Specifically, the user interface 148 may include a display 150 for presenting, showing, or indicating, information to an operator. The controller 152 may also include communications circuitry for communicating data to other devices in the system, such as the wire feeder 134. For example, in some situations, the power supply 132 wirelessly communicates with other welding devices within the welding system. Further, in some situations, the power supply 132 communicates with other welding devices using a wired connection.

The controller 152 includes at least one controller or processor 154 that controls the operations of the welding power supply 132. The controller 152 receives and processes multiple inputs associated with the performance and demands of the system. The processor 154 may include one or more microprocessors, such as one or more "general-purpose" microprocessors, one or more special-purpose microprocessors and/or ASICS, FPGA's, and/or any other type of processing device. For example, the processor 154 may include one or more digital signal processors (DSPs).

In some examples, the controller 152 controls the preheat level and the welding laser power level, and modifies the welding laser power level in response to changes in the preheat level by the user. Additionally or alternatively, the preheat level and/or the welding laser power level may be specified by the user in terms of a target heat input, a target preheating power level, and/or a target ratio between the preheating power and the welding-type laser power.

In some examples, the first power converter 140 is connected to a contact point, such as the first contact point 116 and/or the second contact point 118, to create a preheating pathway through the wire 112 and the workpiece 114.

The example controller 152 includes one or more storage one or more memory device(s) 156. The memory device(s) 156 (e.g., nonvolatile storage) may include ROM, flash memory, a hard drive, and/or any other suitable optical, magnetic, and/or solid-state storage medium, and/or a combination thereof. The memory device 156 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact point and a workpiece, a voltage, a current, welding device settings, and so forth.

The memory device 156 may include a volatile memory, such as random access memory (RAM), and/or a nonvolatile memory, such as read-only memory (ROM). The memory device 156 may store a variety of information and may be used for various purposes. For example, the memory device 156 may store processor executable instructions 158 (e.g., firmware or software) for the processor 154 to execute. In addition, one or more control regimes for various welding processes, along with associated settings and parameters, may be stored in the memory device 156, along with code configured to provide a specific output (e.g., initiate wire feed, enable gas flow, capture welding current data, detect short circuit parameters, determine amount of spatter) during operation.

Communications between the torch 136 and the controller 152 may be implemented based on various types of power line communications methods and techniques. In this manner, the weld cable 162 may be utilized to provide welding laser power from the welding power supply 132 to the welding torch 136 and power the wire feeder 134 via cable 166. Additionally or alternatively, the weld cable 162 and cable 166 may be used to transmit and/or receive data communications to/from the welding torch 136 and the wire feeder 134, respectively.

The controller 152 receives data transmitted by the wire feeder 134 via the cable 166 and the controller 152 transmits data to the welding torch 136 via the weld cable 162. The controller 152 enables remote configuration of the power supply 132 from the location of the wire feeder 134. and/or compensation of weld voltages by the power supply 132 using weld voltage feedback information transmitted by the wire feeder 134. In some examples, the controller 152 receives communication(s) via the weld circuit while weld current is flowing through the weld circuit (e.g., during a welding-type operation) and/or after the weld current has stopped flowing through the weld circuit (e.g., after a welding-type operation). Examples of such communications include weld. voltage feedback information measured at a device that is remote from the power supply 132 the wire feeder 134) while the weld current is flowing through the weld circuit.

In the example welding system 130, a sensor 146 can be configured to include voltage sense leads to measure a voltage drop between the two contact points 116, 118 used for preheating the electrode wire 112. The controller 152 monitors heating anomalies by comparing the measured voltages to target voltage level(s), by evaluating the time derivatives and/or integrals of the measured voltages, and/or by statistical analysis (e.g., means, standard deviations, root-mean-squared (RMS) values, minimum, maximum, etc.). Additionally or alternatively, the controller 152 monitors the stability of the voltage over a longer-term history (e.g. over seconds, minutes and/or hours). Additionally or alternatively, the controller 152 monitors preheat current, preheat power, preheat heat content or enthalpy, and/or preheat circuit impedance via the power supply 132.

In an example, the sensor 146 is an enthalpy measurement circuit configured to determine an enthalpy applied to the workpiece 114. The enthalpy applied to the workpiece 114 by the power supplies 132 is a sum of the enthalpy introduced to the electrode wire 112 by the preheat power source (e.g., the second power converter 142) and the enthalpy introduced by the laser power source (e.g., the first power converter 140). The example measurement circuit may determine the enthalpy based on a measured preheating current or the voltage drop across the preheat portion of the electrode. The controller 152 receives a signal from the sensor 146 and controls the preheating current based on the determined enthalpy and a target enthalpy to be applied to the workpiece 114.

For example, the controller 152 may reduce the preheating current based on welding laser power applied by the welding power supply 132 to maintain a constant enthalpy applied to the workpiece 114. The welding power supply 132 may provide a variable power based on, for example, changes in a contact point to work distance.

Changes in the distance between the tip of the wire 112 and the workpiece 114 can vary. In an example, a feedback signal can represent a change in a measured parameter (e.g., voltage) between a contact point and the workpiece 114. In some examples, feedback signal can represent the voltage between the contact point 116 and the workpiece 114. A change in potential can indicate a change in distance between the contact point 116 and the workpiece 114. The feedback signal can be provided in conjunction with a pre heating system, such that the same contact point providing heating (e.g., one or both of contact points 116, 118) can be used to measure the voltage between the contact point and the workpiece 1144. Additionally or alternatively, the feedback signal can be provided via a contact point in a system not using preheating (e.g., when the preheating function is not in use or in a system and/or welding process that does not use preheating).

In some other examples, a cladding system uses resistive preheating of the electrode wire and a laser energy source to lay the cladding down. The laser beam may be defocused, and no welding arc is present during the cladding operation.

In some welding and/or cladding cases, the welding arc may be controlled via a voltage clamping system, such as an arc clamp module 169, that clamps the voltage between the wire 112 and the workpiece 114 to less than an arc striking voltage. Such a clamping system may include a diode and/or a transistor.

An arc clamp module 169, as used herein, refers to a module that limits the output voltage of the welding-type power supply 132 by providing a current path alternative to the arc so that an arc is extinguished, prevented from forming, or otherwise controlled. The arc clamp module 169 can be passive, wherein it operates without control, or active, wherein it operates in response to one or more control signals.

An arc clamp control module 151 may be used to control a power conversion circuit e 140, 142, 144) of the power supply 132 and/or the arc clamp module 169. For example, leads and/or circuitry may be connected to one or both of the contact points 116, 118 and/or to the arc clamp module 169, to provide a feedback signal to the arc clamp control module 151, and the arc clamp control module 151 controls the output to the arc clamp module 169 in response to the feedback. A feedback circuit may be used that includes a current and/or voltage sensor. The arc clamp module 169 may be controlled in response to current and/or voltage measured from these and/or other sensors (e.g., sensors 146).

The arc clamp module 169 may include a TVS and/or a plurality of diodes, arranged such that the voltage drop across the arc clamp module 169 limits the current in the arc at a desired voltage across the arc clamp module 169 in an example. TVS, or transient voltage suppressor, as used herein, includes modules or devices that are designed to react to sudden or momentary over voltage conditions.

In operation, the arc clamp module 169 receives information from the arc clamp control module 151 to control the voltage across the arc and/or control the current through the arc by providing an alternative current path. The arc clamp module 169 can prevent the voltage or current from rising above a predetermined threshold level, and/or to control an arc or short circuit between the wire and the workpiece. For example, the arc clamp module 169 can redirect the flow of current such that part or all of the current from the power source 113 bypasses existing path with the electrode wire 112, such that the voltage and/or current level does not exceed a threshold value.

The control could be based on user input, built in program and application data, current and voltage feedback, temperature feedback, or a combination thereof. Moreover, closed loop control (using the feedback signal) can be implemented to achieve the desired clamp voltage. For example, an error signal can be derived from the actual clamp voltage and a target or reference clamp voltage, such that as the clamp voltage feedback signal exceeds the reference voltage, an error signal drives a response from the controller.

As employed in the present system, the arc clamp module 169 can prevent an over voltage condition and/or stray current from damaging components of the coaxial laser head 104 and/or welding tool 136.

In some examples, the coaxial laser head 104 may be used to perform metal additive manufacturing and/or additive metal coating. For example, a coating system or additive manufacturing system uses the wire preheating and a laser to build layered compositions.

In some examples, the welding power supply 132 includes a user interface 148 connected to the controller 152 to preheat wire 112. The user interface 148 enables a user of the welding system 130 to adjust a preheating level or provide additional or alternative instructions associated with a preheating level (e.g., a welding-type process, a wire feed speed, an electrode type, etc.). The controller 152 receives instructions (e.g., a preheat level or penetration level) selected via the interface 148 and controls the power supply 132 to change the preheat level. The controller 152 may further control the power supply 132 to adjust one or more aspects of the laser welding power based on the preheat level selected to improve performance at the selected preheat level. The controller 152 is configured to control the preheating power based on at least one of a target total heat input for a weld, a travel speed, a target bead width, or a target penetration depth.

In some examples, the sensor 146 can further include voltage sense leads to measure a voltage across a preheated portion of the electrode wire 112. The voltage sense leads may be coupled, for example, to the two contact points 116, 118, the wire guide 120, the wire feeder 134, a diffuser in the weld torch 136, and/or any other substantially electrically equivalent points. The controller 152 controls the preheat power supply 132 using a preheat control loop which uses the voltage sensed via the leads and the current output by the power supply 132 to maintain a commanded power input, current input, voltage input, enthalpy, and/or impedance to the section of the electrode wire 112. In some examples, the preheat control loop receives information associated with the current and/or voltage as a feedback signal, and uses an error between a commanded preheat voltage and the voltage sensed via the sense leads to adjust the preheat current, the preheat voltage, and/or the preheat power.

FIG. 3 illustrates an example where the processing head 100 is operatively connected to the power supply 132. In the example of FIG. 3, the first power converter 140 is connected to a laser generator 171 which includes a laser source 170, housed within the base 102 and the laser coaxial head 104 to provide power for lenses 106A, 106B. The laser source 170 provides a laser beam(s) 108 to an optic 174. The optic 174 can further direct the laser beams) 108 by focusing on one or more optics 172A and 172B. The optic 174 and optics 172A and 172B can be configured as any type of suitable optic to focus lasing power at the focal point 110, such as a prism, a fiber, a grating, a beam splitter, a half-mirror any combination thereof.

The second power converter 142 is configured to connect a positive lead to the first contact point 116 and a negative lead to the contact point 118 in order to resistively preheat the portion of the electrode wire 112 between the two contact points 116, 118. Additionally or alternatively, the sensor 146 can monitor and/or measure one or more characteristics of the system (e.g., heat, enthalpy, current, voltage, wire feed speed, etc.). The sensor 146 can be configured to provide acquired information to the controller 154, which can adjust one or more variables of the system 130 in response, as described herein. Although the power supply 136 is shown connected. to the coaxial head 100 laterally in FIG. 3, in some examples power for the laser and preheating can be provided from conductors through the arm 162 and wholly integrated with and encased within the coaxial head 100.

Figure 4:
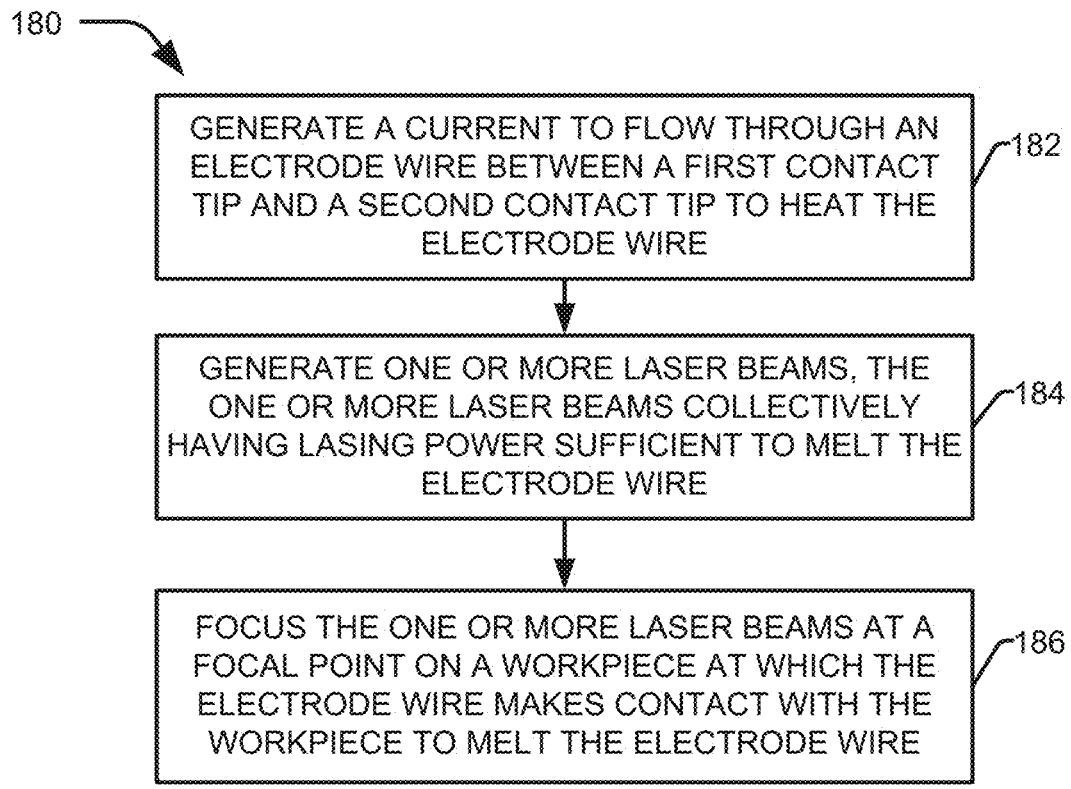
FIG. 4 is a flowchart representative of example method employing the laser processing head of FIGS. 1-3, in accordance with aspects of this disclosure.

FIG. 4 is a flowchart representative of an example method 180, such as implemented as machine readable instructions 158 which may be executed by the controller 152 to control welding operations and/or preheating of a welding electrode wire 112. The example method 180 is described below with reference to the FIGS. 1 and 2.

At block 182, one or more of the power converters 140-144 generates a current to flow through the electrode wire 112 between a first contact point 116 and a second contact point 118 to heat the electrode wire 112. At block 184, one or more of the power converters 140-144 generates power for one or more laser beams 108A, 108B, the one or more laser beams 108A, 108B collectively having lasing power sufficient to at least partially melt the electrode wire 112. At block 186, the one or more laser beams 108A, 108B are focused, such as by the laser coaxial head 104, at one or more focal points 110 on a workpiece 114 at which the electrode wire 112 makes contact with the workpiece 114 to at least partially melt the electrode wire 112.

Figure 5A:
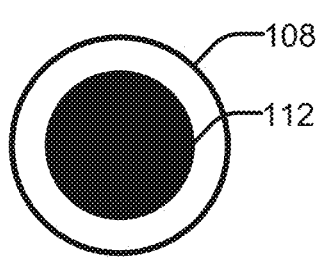
FIGS. 5A through 5D illustrate exemplary laser scanning patterns, in accordance with aspects of this disclosure.

FIGS. 5A through 5D illustrate a variety of configurations for laser beam(s) 108 with respect to the electrode wire 112, as described herein. For example, FIG. 5A illustrates laser beam 108 as scanning a generally circular path around electrode wire 112. The coaxial head 136 may rotate about the central axis defined by the electrode wire 112 to create a cone of laser light with a hollow center (e.g., scanning about the electrode wire 112 to represent a ring spot of the laser beam(s) 108 on workpiece 114).

Although illustrated with the laser beam 108 as having an inner diameter that substantially matches the outer diameter of the electrode wire 112, in some examples the radius of the path may vary and may take on other geometric shapes (e.g., elliptical). Moreover, the laser beam(s) 108 may represent an uneven energy profile, such that one portion of the circular shape may receive a relatively higher amount of energy as the laser beam 108 scans the circular than another, lower energy portion.

Figure 5B:
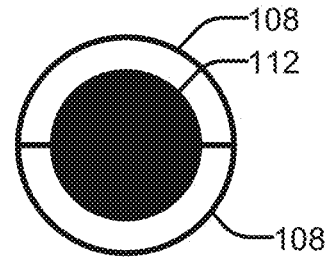
Figure 5C:
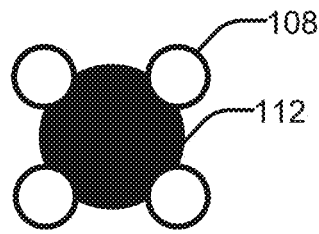
Figure 5D:
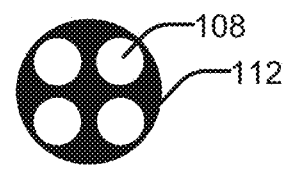

The example shown FIG. 5B represents two laser beams 108 configured to scan an arc around a portion of the electrode 112 (e.g., in a hemispherical shape). FIG. 5C shows a plurality of laser beams 108 directed at four points around the electrode wire 112. One or more of the laser beams 108 may be fixed on a particular point at the electrode wire 112, or may be configured to scan around the electrode wire 112, such as in response to a monitored parameter (e.g., temperature, location of the electrode wire 112 relative the workpiece 114, etc.). FIG. 5D shows a plurality of laser beams 108 focused toward a central point of the electrode wire 112.

Although specific numbers of laser beams, orientations, scanning positions, spot sizes relative to the electrode wire diameter, and/or scanning paths are shown, the figures are simply representative of a number and a variety of implementations that are within the scope of the present disclosure.

For example, the laser beam(s) 108 can scan an elliptical shape with an associated energy profile that proceeds from a relatively higher energy center to a lower energy outer portion. A wide rectangular shape may similarly have an energy profile that proceeds from a relatively higher energy center portion to a lower energy out portion. In some examples, a rectangular pattern may have two relatively higher energy edges on opposite parallel sides. A linear shape may have an energy profile that proceeds from a relatively higher energy portion (e.g. at a center of the line or at an end thereof) to a lower energy portion. Moreover, one or more of the patterns may be superimposed on another, each with a different energy profile, to achieve a desired amount of energy and/or heating profile at the workpiece 114.

The laser processing head described herein provides a number of advantages. In employing the described systems, apparatuses and methods, the position of the welding torch can be adjusted more easily about a single, central axis. Thus, a direction by which a weld can be performed is greatly enhanced, while the laser beam power is closely focused with the electrode wire at the workpiece. Further, the deposition rate of a hot wire is increased compared to a cold wire. The varying and dynamic heating modes also provides a more tailored and responsive solution to preheating. Moreover, parameters such as wire placement position and angle relative to the laser beam can be eliminated, providing fewer variables for the welding process. Also, spinning and/or weaving beneficial for material mixing and spreading inside the puddle. This controls the penetration and serves to refine the microstructure of the weld and/or structure.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)} In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A laser processing head, comprising:
    a first contact point connected to a preheating power source;
    a second contact point connected to the preheating power source, wherein:
        the preheating power source is configured to generate a preheating current to flow through a preheating portion of an electrode wire between the first contact point and the second contact point arranged within the laser processing head to preheat the preheating portion of the electrode wire;
        the first or second contact point is arranged along a central axis extending through the laser processing head; and
        the preheating current is configured to preheat the preheating portion of the electrode wire to a preheating temperature below a melting temperature of the electrode wire;
    a laser source configured to generate one or more laser beams having lasing power sufficient to at least partially melt the electrode wire; and
    a coaxial laser head configured to focus the one or more laser beams onto a workpiece from first and second lenses that are offset from the central axis at a focal point on the workpiece to at least partially melt the electrode wire, the first lens arranged opposite the second lens relative to the central axis,
    wherein the first and second lenses and the one or more laser beams are configured to rotate consistently during welding about the central axis that is collinear with the first contact point, the second contact point, or the electrode wire as the electrode wire moves through the first and second contact points and through the laser processing head to the workpiece.

2. The laser processing head as defined in claim 1, the first contact point and the second contact point form part of a preheating system integrated with and encased within the laser processing head, wherein the preheating portion of the electrode wire is in electrical contact with both the first contact point and the second contact point within the laser processing head.

3. The laser processing head as defined in claim 1, wherein the focal point corresponds to a location at which the electrode wire makes contact with the workpiece.

4. The laser processing head as defined in claim 1, wherein the preheating power source comprises a controller configured to control a level of current flowing through the electrode wire between the first and second contact points to adjust a level of heating in the preheating portion of the electrode wire.

5. The laser processing head as defined in claim 1, wherein the preheating power source comprises a controller configured to:
    receive a voltage measurement between the first and second contact points from a sensor in a voltage feedback loop; and
    control a level of voltage based on the voltage feedback loop.

6. The laser processing head as defined in claim 1, wherein the coaxial laser head is configured to scan the one or more laser beams about the focal point as a hollow coned-shaped beam by scanning the first and second lenses and the one or more laser beams about the electrode wire to represent a ring spot of the one or more laser beams on the workpiece.

7. The laser processing head as defined in claim 1, wherein the coaxial laser head is configured to:
    split a laser beam of the one or more laser beams into two or more beams through the first and second lenses; and
    focus the two or more beams toward the focal point during the rotation of the first and second lenses while generating the two or more beams continuously during welding.

8. The laser processing head as defined in claim 1, wherein the laser processing head is configured to perform an additive manufacturing operation using the electrode wire.

9. A method to perform an additive manufacturing, welding or cladding process, the method comprising:
    generating, at a preheating power source, a preheating current to flow through a preheating portion of an electrode wire advancing through a laser processing head, the preheating portion being between a first contact point and a second contact point within the laser processing head, to preheat the preheating portion of the electrode wire to a preheating temperature below a melting temperature of the electrode wire;
    generating, at an arc welding power source, arc welding power to flow through the electrode wire and a workpiece to create an arc between the electrode wire and the workpiece;
    generating, at a laser source within the laser processing head, one or more laser beams, the one or more laser beams collectively having lasing power sufficient to at least partially melt the electrode wire when the electrode wire is preheated to the preheating temperature;
    focusing, by the laser source and through first and second lenses offset from a central axis extending through the laser processing head, the first lens arranged opposite the second lens relative to the central axis, the one or more laser beams at a focal point on the workpiece at which the electrode wire makes contact with the workpiece to at least partially melt the electrode wire; and
    rotating the first and second lenses during welding,
    wherein the laser processing head is configured to rotate the first and second lenses consistently during welding about the central axis that is collinear with the second contact point and the electrode wire as the electrode wire moves through first and second contact points and through the laser processing head to the workpiece.

10. The method as defined in claim 9, further comprising controlling, by a controller, a level of current flowing through the electrode wire to adjust a level of heating in the electrode wire in response to a voltage feedback signal.

11. The method as defined in claim 9, further comprising adjusting, by the preheating power source, a heat value of the electrode wire based on a deposition rate of the electrode wire.

12. The method as defined in claim 9, further comprising adjusting at least one of a lasing power level, a spot size of the one or more laser beams, or a shape of the one or more laser beams to adjust a power profile of the one or more laser beams at the focal point.

13. A laser welding system, comprising:
a wire feeder to drive an electrode wire to a laser processing head, the laser processing head comprising a first contact point and a second contact point arranged along a central axis and encased within the laser processing head;
one or more power sources connected to both of the first and second contact points, the one or more power sources configured to:
generate a current to flow through the electrode wire between the first contact point and the second contact point to heat a portion of the electrode wire within the laser processing head; and
provide power to the electrode wire to create an arc between the electrode wire and the workpiece via the first contact point or the second contact point;
a laser source configured to generate one or more laser beams having lasing power sufficient to at least partially melt the electrode wire;
a coaxial laser head of the laser processing head configured to focus the one or more laser beams through first and second lenses offset from the central axis to one or more focal points on the workpiece to at least partially melt the electrode wire, the first lens arranged opposite the second lens relative to the central axis, wherein the coaxial laser head is configured to consistently rotate the first and second lenses during welding about the central axis that is collinear with the first contact point, the second contact point, and the electrode wire as the electrode wire moves through the first and second contact points and through the laser processing head to the workpiece; and
an arc clamp module coupled to the first contact point and the second contact point, the arc clamp module configured to provide an alternative current path to redirect at least a part of the current to flow through the alternative current path to extinguish the arc or prevent the arc from forming.

14. The laser welding system as defined in claim 13, further comprising a wire heater configured to heat the electrode wire at a location before or after the first and second contact points along a wire feed path of the electrode wire.

15. The laser welding system as defined in claim 13, wherein the laser source is configured to select a shape of a spot of lasing power or distribution of lasing power at the workpiece to correspond to one of a plurality of heat profiles.

16. The laser welding system as defined in claim 13, wherein the laser source comprises an optical device configured to focus the one or more laser beams, the optical device comprising one of a beam splitter, a mirror, an optical fiber, a lens, and a diffraction grating.

17. The laser welding system as defined in claim 13, wherein the arc clamp module is further configured to:
provide a feedback signal to a controller associated with a measured voltage or a measured current at the first contact point and the second contact point; and
redirect the at least a part of the current to flow through the arc clamp module in response to a control signal from the controller based on the feedback signal.

18. The laser welding system as defined in claim 13, wherein:
the current is a preheating current configured to preheat the electrode wire to a preheating temperature below a melting temperature of the electrode wire;
the power is an arc welding power provided to the electrode wire via the second contact point to flow through the electrode wire between the second contact point and the arc; and
the arc clamp module is further configured to redirect the at least a part of the current through the alternate current path such that at least one of a measured current of the arc welding power or a measured voltage of the arc welding power does not exceed at least one of a threshold voltage value or a threshold current value.

19. The method as defined in claim 9, wherein:
the arc welding power generates the arc between an arc exit point of the electrode wire and the workpiece;
the arc welding power flows through an arc welding portion of the electrode wire between the second contact point and the arc exit point of the electrode wire;
a preheating pathway of the preheating current extends:
from the preheating power source to the first contact point;
from the first contact point through the preheating portion of the electrode wire to the second contact point; and
from the second contact point to the preheating power source; and
an arc welding pathway of the arc welding power extends:
from the arc welding power source to the second contact point;
from the second contact point through the arc welding portion of the electrode wire to an exit point of the electrode wire;
from the exit point of the electrode wire to the workpiece; and
from the workpiece to the arc welding power source.

20. The method as defined in claim 19, further comprising redirecting, using an arc clamp, flow of at least a part of the arc welding power through an alternate current path such that the at least a part of the arc welding power bypasses the arc exit point of the electrode wire such that at least one of a measured current of the arc welding power or a measured voltage of the arc welding power does not exceed at least one of a threshold voltage value or a threshold current value.

* * * * *